United States Patent
Vermette

(10) Patent No.: US 9,672,231 B2
(45) Date of Patent: Jun. 6, 2017

(54) CONCURRENT ACCESS FOR HIERARCHICAL DATA STORAGE

(71) Applicant: Oracle International Corporation, Redwood Shores, CA (US)

(72) Inventor: Shane Robert Vermette, San Carlos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/989,480

(22) Filed: Jan. 6, 2016

(65) Prior Publication Data

US 2016/0117351 A1    Apr. 28, 2016

Related U.S. Application Data

(63) Continuation of application No. 13/714,626, filed on Dec. 14, 2012, now Pat. No. 9,244,961.

(51) Int. Cl.
*G06F 17/30* (2006.01)
*G06F 21/62* (2013.01)

(52) U.S. Cl.
CPC .. *G06F 17/30315* (2013.01); *G06F 17/30067* (2013.01); *G06F 17/30312* (2013.01); *G06F 17/30321* (2013.01); *G06F 21/6218* (2013.01)

(58) Field of Classification Search
CPC ............. G06F 17/30289; G06F 17/30; G06F 17/30091; G06F 17/30575; G06F 17/30067; G06F 17/30321; G06F 21/6218
USPC .................................................. 707/781–788
See application file for complete search history.

(56) References Cited

U.S. PATENT DOCUMENTS

| | | | |
|---|---|---|---|
| 7,020,661 B1 | 3/2006 | Cruanes et al. | |
| 7,395,262 B1 | 7/2008 | Rothrock | |
| 8,868,484 B2 * | 10/2014 | Aggarwal | 707/602 |
| 2005/0004936 A1 * | 1/2005 | Potapov et al. | 707/103 R |
| 2006/0212492 A1 * | 9/2006 | Jacobs et al. | 707/202 |
| 2007/0150474 A1 | 6/2007 | Szilagyi et al. | |
| 2010/0036862 A1 | 2/2010 | Das et al. | |
| 2012/0117081 A1 | 5/2012 | Das et al. | |
| 2013/0282985 A1 | 10/2013 | Dantzig et al. | |

OTHER PUBLICATIONS

G Pei et al., A wireless hierarchical routing protocol with group mobility, 1999, IEEE, 1538-1542.*
Sayers, Craig, et al. "The case for generating URIs by hashing RDF content", Aug. 22, 2002, Hewlett-Packard Company, pp. 1-13.

* cited by examiner

*Primary Examiner* — Jean B Fleurantin
(74) *Attorney, Agent, or Firm* — Kilpatrick Townsend & Stockton LLP

(57) ABSTRACT

Methods, systems, and computer-readable storage mediums are presented for aggregating multiple values for an object using database rows. Each value added to the database for the object may include a same primary key and a unique sequence key. This allows multiple values to be added for an object concurrently by simply adding additional rows to the database table. After values have been added, a process can identify multiple rows having the same primary key and aggregate the values stored in those rows together into a single database row having the primary key. This can be done as part of a garbage-collection routine or in response to other processes attempting to add additional values for the object.

17 Claims, 15 Drawing Sheets

| Functional Primary Key | | Sequence No. | Value |
|---|---|---|---|
| ... | ... | ... | ... |
| Ni | A | s1 | 10 |
| Ni | B | s2 | 15 |
| Ni | B | s3 | 3 |
| ... | ... | ... | ... |

FIG. 6B

| Functional Primary Key | | | Sequence No. | Value |
|---|---|---|---|---|
| ... | ... | Ni | ... | ... |
| ... | ... | Ni | A | s1 | 10 |
| ... | ... | Ni | B | s2 | 15 |
| ... | ... | Ni | B | s3 | 3 |
| ... | ... | Ni | B | s4 | 24 |
| ... | ... | ... | ... | ... |

CONCURRENT ACCESS FOR HIERARCHICAL DATA STORAGE

CROSS-REFERENCES TO RELATED APPLICATIONS

This application is a continuation of U.S. patent application Ser. No. 13/714,626 filed on Dec. 14, 2012, which is incorporated herein by reference.

BACKGROUND OF THE INVENTION

In information technology and computer science, especially in the fields of computer programming, operating systems, multiprocessors, and databases, concurrency control ensures that correct results for concurrent operations are generated, while getting those results as quickly as possible. Computer system components can be designed to interact by sharing access to data (in memory or storage). The general area of concurrency control provides rules, methods, design methodologies, and theories to maintain the consistency of components operating concurrently while interacting, and thus the consistency and correctness of the computer system as a whole. Introducing concurrency control into a system means applying operational constraints that in the past have resulted in some performance reductions.

Managing large businesses may involve storing, aggregating, and analyzing large amounts of data. Many organizations use Enterprise Software Systems to manage almost every form of business data. For example, Enterprise Software Systems can provide business-oriented tools such as online shopping and online payment processing, interactive product catalogs, automated billing systems, security, enterprise content management, IT service management, customer relationship management, enterprise resource planning, business intelligence, project management, collaboration, human resource management, manufacturing, enterprise application integration, and Enterprise forms automation.

Enterprise Software Systems can integrate internal and external management information across an entire organization. Enterprise Software Systems may be used to automate activities between these different resources within an integrated software application. One purpose may be to facilitate the flow of information between business functions across boundaries of an organization, and to manage the connections between outside stakeholders and internal resources. In these areas, data concurrency controls may govern how various systems within an Enterprise Software System interact with shared data structures, particularly hierarchical data structures.

BRIEF SUMMARY OF THE INVENTION

In one embodiment, a method of providing concurrent access to a hierarchy in a data structure may be discussed. The method may include receiving a request from a first process to change a first value associated with an object, where the request may include a second value to be combined with the first value. The method may also include determining that a second process is currently accessing information associated with the object. The method may additionally include associating, in response to determining that the second process is currently accessing information associated with the object, the second value with the object without combining the first value and the second value.

In some embodiments, the method may also include combining the first value and the second value at a time when the second process is no longer accessing the information associated with the object. The first value and the second value may be combined as part of a data structure clean-up routine.

In other embodiments, the method may also include receiving a second request to access the information associated with the object; determining that no other processes are currently accessing the information associated with the object; determining that the first object is associated with the first value and the second value; and combining the first value and the second value. The object may include one or more rows in a database, and associating the second value with the object may include adding a row to the database that identifies the object and includes the second value. The row and each of the one or more rows may include a same functional primary key. The row and each of the one or more rows may include different sequence keys. The second value may be associated with a child object of the object in the hierarchy, and the request from the first process may be part of a data rollup operation.

In some embodiments, the object may include one or more rows in a database, and the method may further include determining that the first object is associated with the first value and the second value, and combining the first value and the second value at a time when the second process is no longer accessing the information associated with the object. The hierarchy may be a single-parent hierarchy. The hierarchy may be a multi-parent hierarchy. Additionally, a plurality of values associated with the object may be bounded in size by the number of processes concurrently most recently accessing the information associated with the object.

In another embodiment, a computer-readable memory may be presented. Then computer-readable memory may have stored thereon a sequence of instructions which, when executed by one or more processors, causes the one or more processors to provide concurrent access to a hierarchy in a data structure. The instructions may cause the processor(s) to receive a request from a first process to change a first value associated with an object, where the request may include a second value to be combined with the first value. The instructions may also cause the processor(s) to determine that a second process is currently accessing information associated with the object. The instructions may additionally cause the processor(s) to associate, in response to determining that the second process is currently accessing information associated with the object, the second value with the object without combining the first value and the second value.

In yet another embodiment, a system may be presented. The system may include one or more processors and a memory communicatively coupled with and readable by the one or more processors. The memory may have stored therein a sequence of instructions which, when executed by the one or more processors, cause the one or more processors to provide concurrent access to a hierarchy in a data structure. The instructions may cause the processor(s) to receive a request from a first process to change a first value associated with an object, where the request may include a second value to be combined with the first value. The instructions may also cause the processor(s) to determine that a second process is currently accessing information associated with the object. The instructions may additionally cause the processor(s) to associate, in response to determining that the second process is currently accessing information associated with the object, the second value with the object without combining the first value and the second value.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIGS. 6A-6D illustrate a database implementation for concurrently accessing hierarchical data, according to one embodiment.

DETAILED DESCRIPTION

Figure 1:
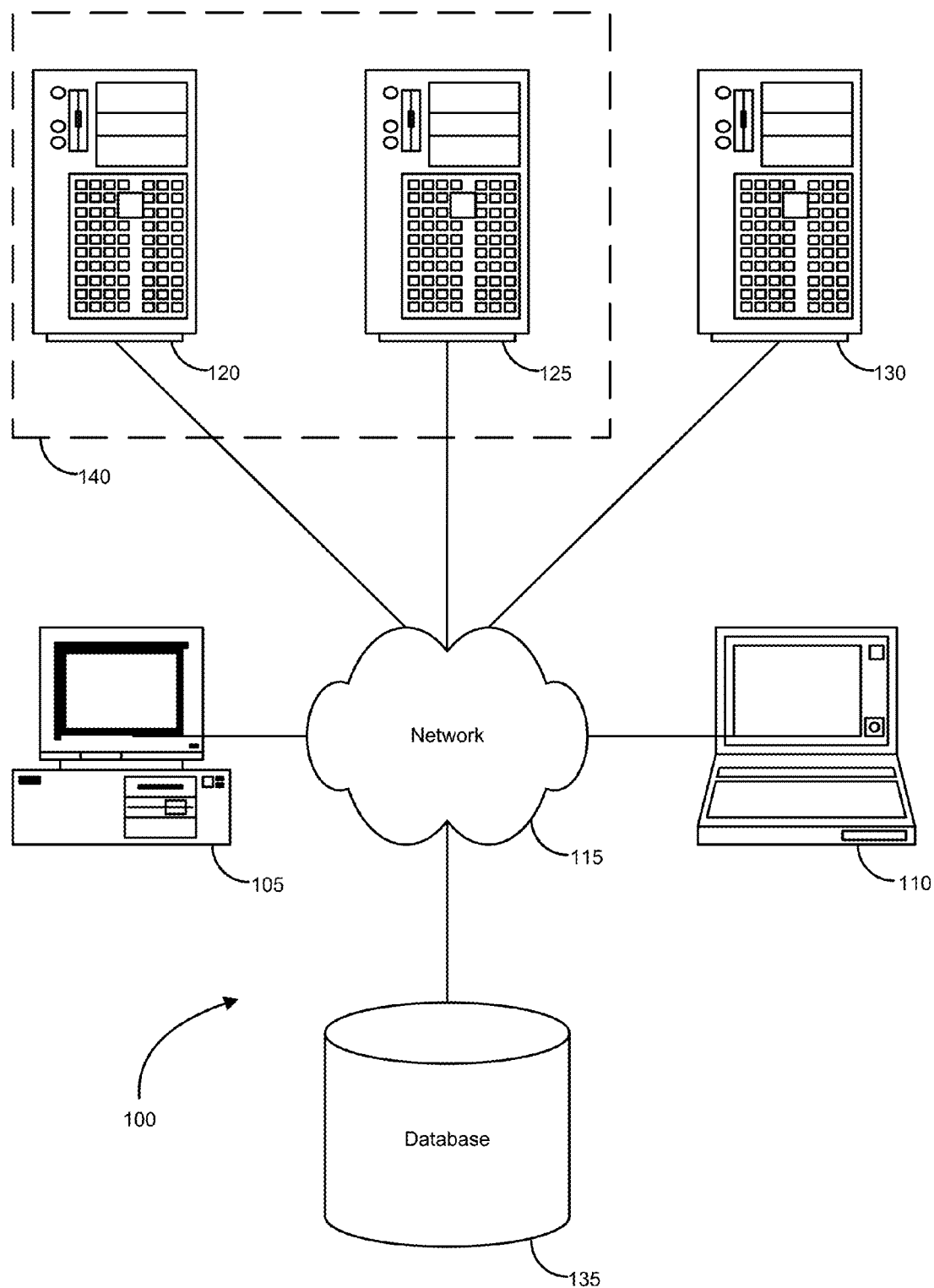
FIG. 1 illustrates a block diagram of components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein, are embodiments for concurrently accessing hierarchies of data. In a parent-child hierarchy of data objects, it is possible that two or more separate processes may attempt to access a single data set at the same time. In some cases, these different processes can load data that affects overlapping subsets of objects. This may be particularly true in a data hierarchy where changes to child objects are "rolled up" through the hierarchy. In one embodiment, the new values can be added to child objects, and these new values can be aggregated through each parent object in the hierarchy. The methods and systems described herein allow for these data roll ups to happen concurrently and for aggregated amounts for any object to be queried in real-time.

These methods and systems can be applied across to a wide range of computing hardware and/or software systems. For example, in a reporting solution, such as the Resource Management Dashboard provided by Oracle® Fusion applications, objects within a hierarchy may represent resources managed by the Enterprise Software System. In other words, child objects may represent an employee, a computing resource, a department, a project, an IT asset, and/or the like. These objects can be arranged in a hierarchy in order to quickly query resource use in different levels of an organization. For example, child objects may represent computing resources at a particular location. A parent object may represent a total load of the computing resources at the particular location. A user or process may query either an individual object to see that resource's workload, or alternatively may query the parent object to see the total workload for all of the resources at the particular location.

Similarly, a grandparent object could represent the aggregate total of resource workloads at various locations within a particular region, and so on.

In these types of reporting solutions, there may exist a need to roll data up the hierarchy at some point after a child object is accessed and/or updated. There may also exist a need to query data at any particular object level in real-time. Furthermore, there can be many different functional methods that create or identify data against the objects in the hierarchy, and each of these functional methods may have unique data needs. Therefore, it may not be an uncommon situation for many processes to attempt to access/view/update information residing within one or more nodes within the hierarchy at approximately the same time.

Previous solutions to the problem of rolling data up a hierarchy have generally not allowed multiple processes to roll data up the hierarchy at the same time. In these solutions, the first process to access a data set would acquire the exclusive ability to update data objects within the data set. In a hierarchy, an accessing process could receive exclusive control over objects within a hierarchical line, such that a change to a child object could be rolled up through the hierarchy without colliding with other processes. Therefore, any processes that tried access the data set while the first process had exclusive control would have to simply wait until the first process was finished performing its data operations and subsequently relinquished exclusive control.

Because every process had to wait for other processes to finish, lag time between when data was created and when it was accessible by a query in a stored format increased. This lag time may be attributed to latency in processing the data, time spent managing the overhead of various processes, and the time it took for an accessing process to work its way through the queue of processes waiting to gain exclusive control. This lag time could affect functionality, in that data could become stale while it waited for other processes to update the data structure. Furthermore, additional complexity and overhead may be introduced in such previous solutions since it may be necessary to have methods in place to queue the various processes or to have priorities assigned to the various processes that want to roll data up the hierarchy.

As described, previous solutions do not allow rolling data up the hierarchy by multiple processes at the same time while allowing the aggregated data to be accessed by a query in real-time for either the processes rolling up the data or for the processes querying the aggregated data. The methods and solutions described herein achieve this by, among other things, relaxing a constraint that is typically enforced on data in a relational data structure. Typically, objects within the relational data structure include a primary key. The relational data structure typically only allows one entry using a given primary key. In contrast, the methods and systems described herein relax this restriction and allow multiple values to exist for a single primary key. In other words, duplicate rows can be added to a database containing different values.

The methods and solutions described herein may also add an additional step of aggregation to the access routine based on a query. Because multiple values may exist for a single primary key, accessing a data object associated with a primary key may involve detecting these multiple values and aggregating their values into a single value. Although this may require an additional aggregation step, the embodiments described herein can guarantee that the number of multiple values to be aggregated in the additional aggregation step will be kept low. Specifically, the size of the data set that the query needs to aggregate can be at most a multiple of the size after the aggregation, and in practice the multiple can be close to or equal to 1 (note that the multiple need not necessarily be an integer value). The upper bound will be equal to the number of processes that were rolling up data at one time most recently to the objects or dataset in the hierarchy that the query is currently accessing. So, the amount of data that needs to be aggregated by a query accessing the data in the hierarchy is not dependent on the size of the hierarchy. This makes these methods scalable to any size data structure. The upper bound can increase and/or decrease with load on the system.

The remainder of this disclosure will describe in detail various embodiments of methods and systems for concurrent access to data hierarchies. First, an exemplary computer system and network environment will be described that can be used to implement various aspects of these embodiments. Next, a general description of the solution will be described in relation to a generic data structure. Afterwards, an exemplary embodiment will be illustrated using a relational database. It will be understood that the specific embodiment is merely exemplary, and provided simply to aid in the understanding of certain aspects of various embodiments.

Each of the embodiments disclosed herein may be implemented in a computer system. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
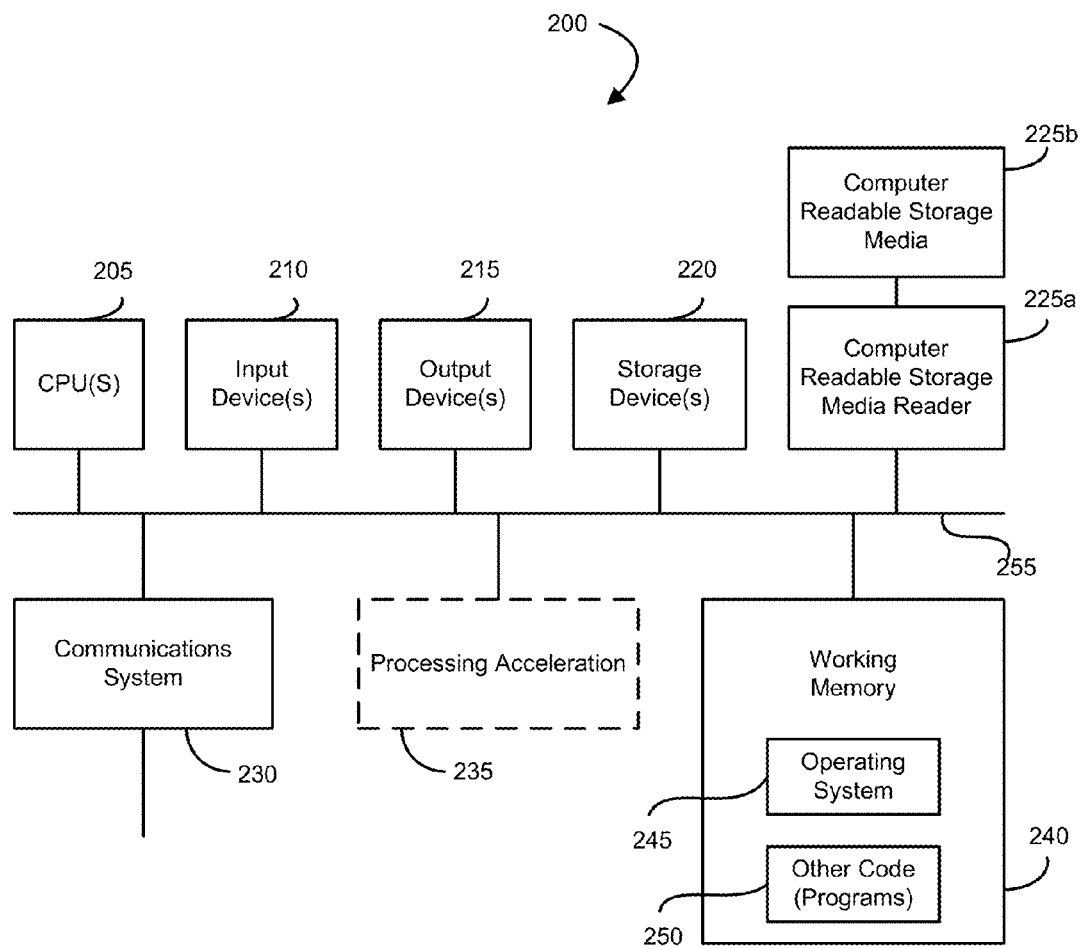
FIG. 2 illustrates a block diagram of an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Each of the methods described herein may be implemented by a computer system, such as computer system 200 in FIG. 2. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

Figure 3:
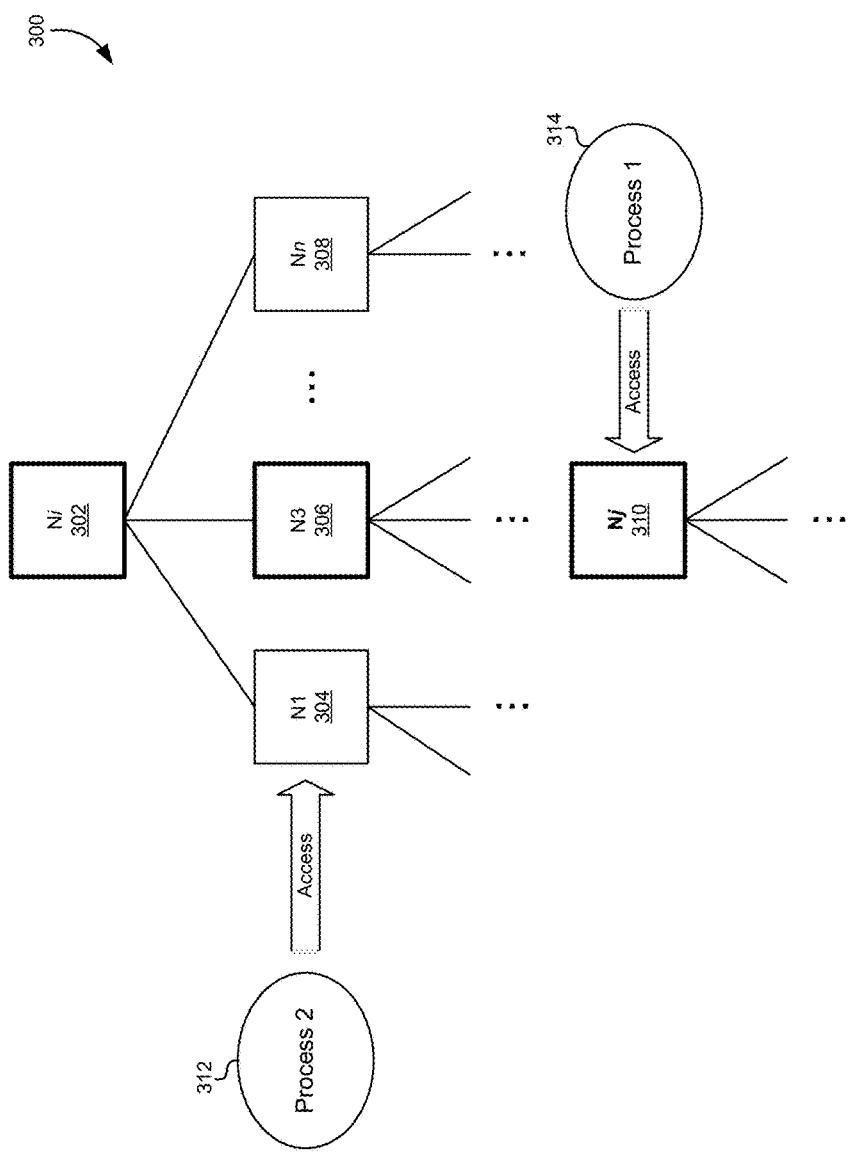
FIG. 3 illustrates a block diagram of a data structure, according to one embodiment.

FIG. 3 illustrates a block diagram 300 of a data structure, according to one embodiment. This block diagram 300 may be representative of many different data structures that can be organized as a hierarchy. These data structures may include trees, binary trees, relational databases, linked lists, hash maps, arrays, vectors, matrices, and/or the like. Block diagram 300 is organized as a tree simply to show the parent-child relationships, not necessarily because it represents a tree data structure. Although the data structure illustrated in FIG. 3 is a single-parent data structure, this is only for simplicity. The methods and systems described herein may apply equally to multi-parents data structures as well.

The data structure may be comprised of a number of different objects. These objects may also be referred to as nodes, entries, rows, and/or elements. Each object may be associated with one or more child objects, as well as one or more parent objects. For example, object 302 is a parent object of object 304, object 306, and object 308. Object 310 is related to object 302 and object 306 through a relationship within the hierarchy. This relationship may be a grandparent, great grandparent, and so forth, depending upon the number of objects between object 306 and object 310.

In a hierarchical data structure where values can be rolled up the data structure as they are entered into child objects, a change to a child object may result in changes to each parent, grandparent, etc. throughout the hierarchy. For example, a change to object 310 may be rolled up to change object 306 and object 302. Therefore, a set of objects can be identified in the parent-child hierarchy that may be affected by any change. This set of objects can generally be defined as the ancestors to the child object accepting the change.

For example, process 314 may access an object 310 and change the value stored therein. The set of objects that may be affected by this change value may include object 310, object 306, object 302, and other objects not shown specifically by the block diagram 300 that are organized between object 306 and object 310. In some embodiments, process 314 may be granted exclusive access to change the values within this set of objects. In one embodiment, exclusive access may be granted one-at-a-time to each object within the set of objects. In another embodiment, exclusive access may be granted to the entire set of objects at once.

Although the embodiment illustrated by FIG. 3 may be performed on each individual object in the hierarchy, other embodiments may operate on multiple objects during a single grant of exclusive control. For example, other embodiments may grant exclusive control to a "branch" of the hierarchy or to some other subset of objects in the hierarchy. In another embodiment, a data system storing the hierarchy of objects may be processing roll ups for a plurality of objects around the same time interval. In other words, multiple processes may access a single hierarchical data set at around the same time. In some cases, these multiple processes may access branches that result in data collisions, while in other cases these multiple processes may largely operate independently on the data set without collisions when exclusive control is granted.

After process 314 changes the value of object 310, that value change may be propagated up to object 306. Next, the value change may propagated to object 302. In this example, a second process, namely process 312 may also be currently rolling data up the hierarchy. If process 312 makes change to object 304, then that value change may also be propagated up to object 302. In this case, the value change initiated by process 314 may win the race and gain exclusive access to change the value of object 302. Therefore, the process change initiated by process 312 may not also have access to the same memory location in which the value for object 302 is stored.

Figure 4:
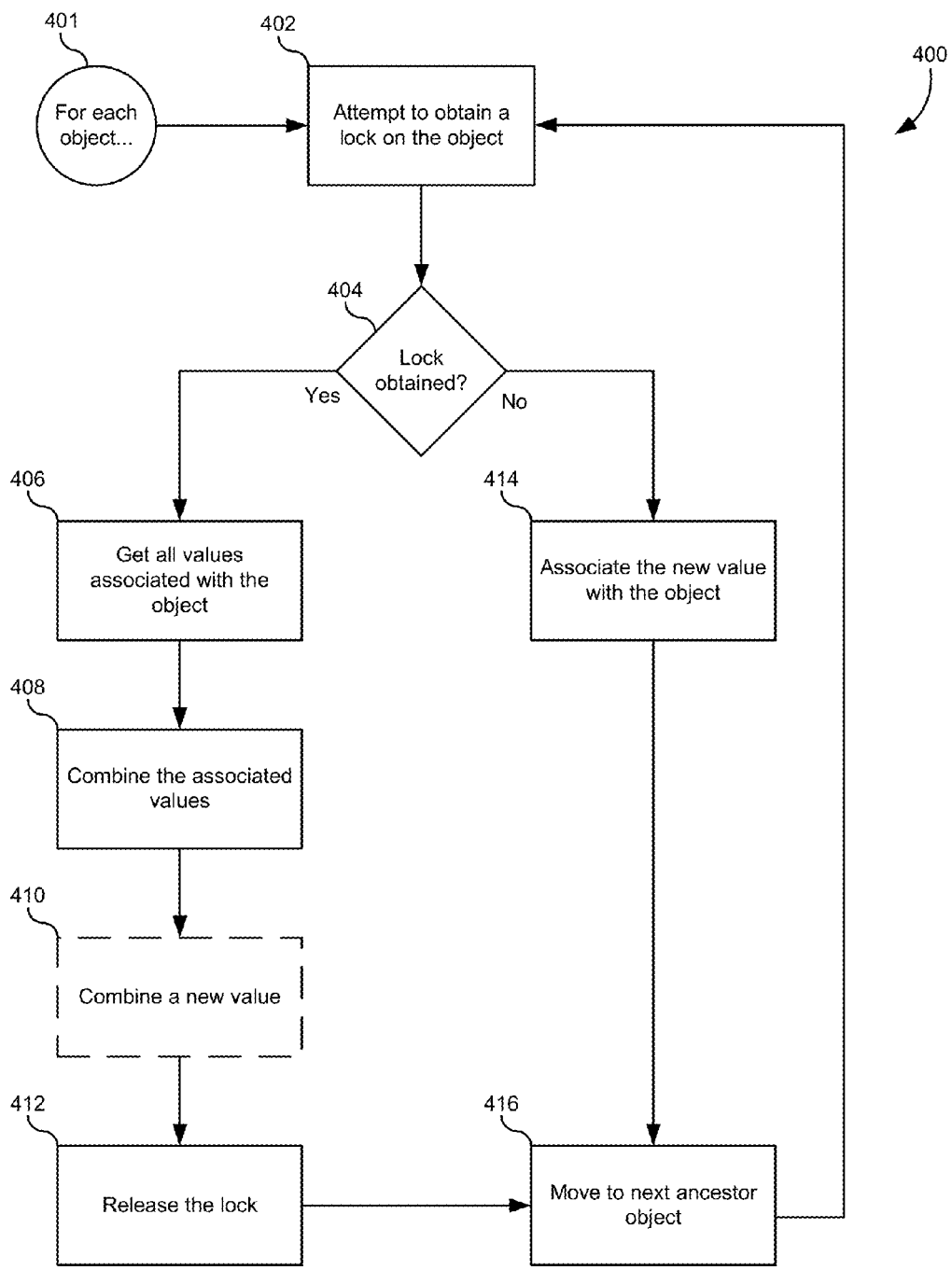
FIG. 4 illustrates a flowchart of a method for concurrently accessing a hierarchy, according to one embodiment.

In one embodiment, a method may be followed for processes that can achieve exclusive control as well as those processes that are excluded from the memory location storing the value for a particular object. FIG. 4 illustrates a flowchart 400 of a method for concurrently accessing a hierarchy, according to one embodiment. This method may be applied to each object one-at-a-time by each process as data is rolled up by the hierarchy (401), or in parallel for all ancestors using sub-processes. Also, the locks can be attempted first for all ancestors by each process and then the data rollups can be performed by each process for the whole hierarchy in, for example, two operations using SQL operations (e.g., one SQL command for the locked objects and one SQL command for the non-locked objects). Each process may first attempt to obtain exclusive control over the object (402). As used herein, exclusive control may also be referred to as a "lock" on the object. A lock may be implemented using a semaphore, or any other similar programming technique. It should be noted that while the methods herein describe the lock occurring at the object level, these methods would work similarly if the lock were attempted at the functional primary key level (which may include the object identifier and can include some additional identifiers, described in greater detail below).

If no other processes have previously obtained the lock, then the current process may obtain the lock (404). However, if another process has already obtained the lock, then the current process might not have direct access to a memory location storing the value associated with the object. In some embodiments, if the process does not immediately obtain a lock upon request, then the lock may not be obtained at all. As used herein, an object may be associated with various pieces of information. Information associated with the object may include a memory location storing data associated with the object. For example, an object in a tree data structure may have a "value" memory location allocated to store a numerical value for that particular object. In a relational database, a row of data or a particular field within a row may be used to store a particular value.

Note that in previous solutions, if a lock is not obtained, the current process would have to wait until the locking process finished accessing the object value and returned the lock. In contrast, in some embodiments described herein, the current process can associate a new value with the object (414). This association may take place while another process holds the lock. In this context, "associating" can be something different than accessing the actual value associated with the object. In some embodiments, associating a new value with the object may comprise adding a link to a new value. In other embodiments, associating a new value with the object may comprise adding an additional row using a primary key associated with the object. Generally, this step may result in at least two values existing at the same time that are associated with a particular object. These two values can be allowed to persist until another object obtains the lock on the object or the object is queried for viewing. Generally, "associating" a value with an object may simply be a different function than writing or storing a value in an object. These differences depend upon the particular data structure implementation of the hierarchy. However, it can be stated that the process obtaining the lock will store a value differently than the process not obtaining the lock.

Instead of waiting for the other process to return the lock, the current process can simply associate the new value with the object. Then, the current process can move to the next ancestor object (416), or wait for the other ancestors that are being done in parallel, or process all the data at once using SQL operations. Note that the process holding the lock may finish processing the current object and also try to update a value in the next ancestor object as well. It does not matter which of the two competing processes acquires the lock on the next ancestor object. In some cases, processes may alternate acquiring the lock as they move up the data hierarchy, and in some cases the distribution of locks may be completely arbitrary if, for example, process 312 and process 314 themselves use multiple sub-processes each to rollup data to all of their respective ancestors in parallel, or if process 312 and process 314 attempt to obtain locks on all of their respective ancestors first before using, for example, SQL operations to rollup the data to all ancestors at once.

If the current process obtains the lock on the object, then other processes attempting to access the object at the same time can follow the procedure described above, and can associate their values with the object. The process obtaining the lock can get a list of all the values associated with the object (406). In one embodiment, this may be done using a function that returns the ROWIDs for each row in a database associated with a functional primary key. It should be noted that it does not affect the methods if new values are associated to the object even after the process obtaining the lock has received the list of values (and before it returns the lock), since those values will simply be aggregated by any process querying the data.

The locking process can then combine all of the values associated with the object to create a single value (408). As used herein, the term "combine" may include any function that can be used to combine values. For example, the associated values may be added (aggregated), subtracted, multiplied, divided, etc. In one embodiment, each object may represent a particular resource, and associated values may be aggregated together to determine a workload for the object.

Optionally, the locking process may combine the associated values with a new value provided by the process itself (410). For example, an object may have three values associated with the object stored in memory. The locking process may provide a fourth value and aggregate all four values together to form a single, new value. In one embodiment, this may include committing values to a database and deleting the rows identified by the initial ROWID operation for the functional primary key of the object.

Steps 406, 408, and 412 may also be carried out in response to a query to view the object value. Therefore, multiple values for a single object may persist until a process obtains a lock on the object, or until a process views the object. The viewing operation may require the computer system to aggregate or combine all of the values associated with the object. This operation may be carried out by the user interface, but will more typically be carried out by the data management system controlling access to the hierarchical data structure. In practice there are likely to be many more processes concurrently trying to view the data than there concurrently are processes concurrently trying to rollup the data.

When rolling values up a hierarchy, the process described by FIG. 4 may be repeated for each ancestor object affected by an initial value change, or may be executed for all the ancestor objects in parallel either, for example, by using parallel sub-processes or by performing actions across all hierarchy data via, for example, SQL operations on the tables that contain the data. Described next is a generic example of processes concurrently accessing an object and rolling a value change up a hierarchy of objects.

Figure 5A:
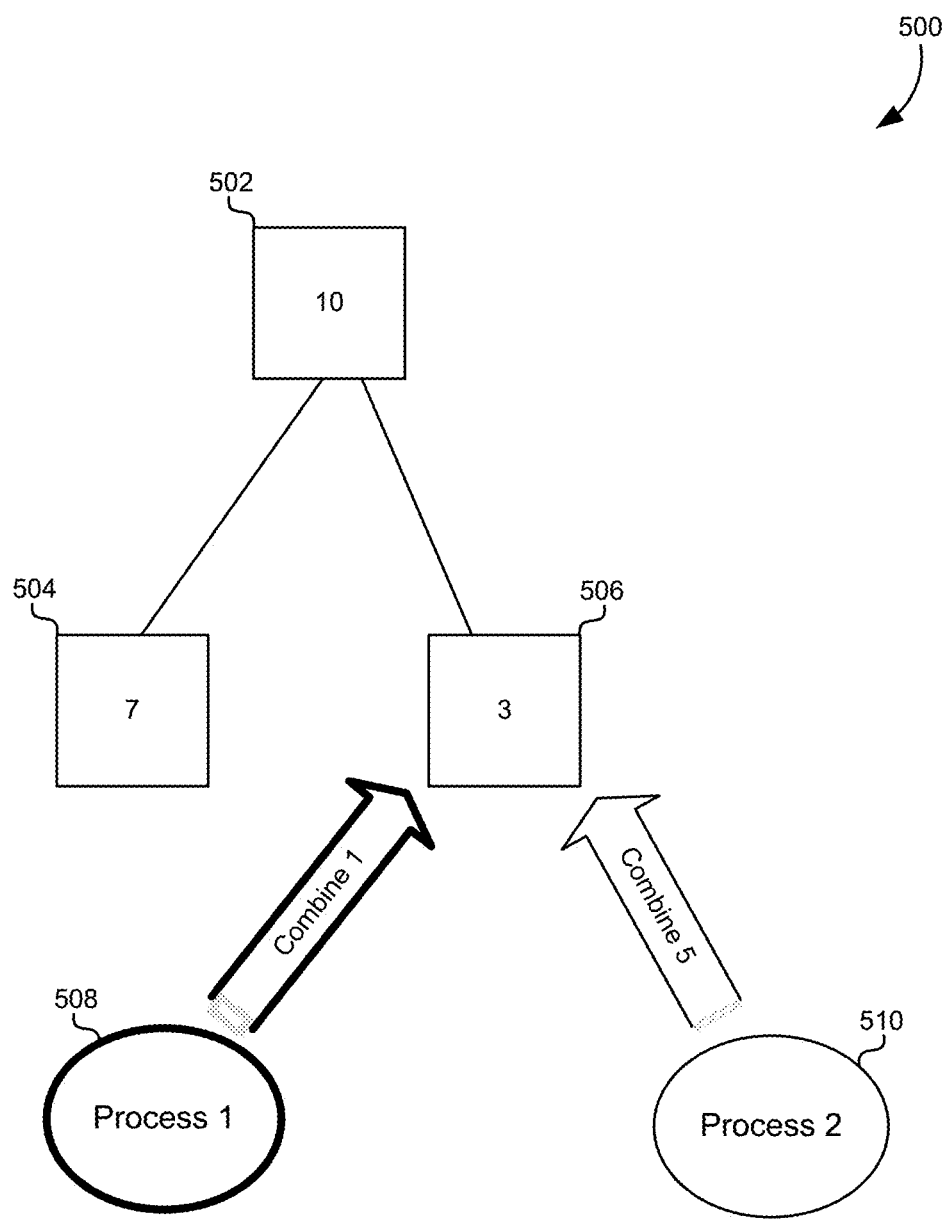
FIGS. 5A-5E illustrate two processes concurrently rolling data up a hierarchy, according to one embodiment.

FIGS. 5A-5E illustrate two processes concurrently rolling data up a hierarchy, according to one embodiment. Although the data structure 500 illustrated by these figures appears to be a tree structure, it should be interpreted more generally as a graphical representation of a parent-child hierarchy. It will be understood that any data structure that can represent hierarchies may be used instead. FIG. 5A illustrates the data structure 500 where two competing processes are attempting to combine new values with an object.

Specifically, process 508 is attempting to combine the value "1" with object 506. Around the same time, process 510 may be attempting to combine the value "5" with object 506. Object 506 may already have a value of "3" stored therein. Process 508 may successfully obtain a lock on object 506. Therefore, process 508 may first detect any additional values associated with object 506 (in this case there are none), and then combine those values and the value "3" stored therein with the value of "1".

Process 510, on the other hand, may not obtain the lock on object 506, because the lock was previously obtained by process 508. Therefore, process 510 may associate the value of "5" with object 506 instead of aggregating and combining values like process 508. In one embodiment, this may comprise storing the value of "5" to another memory location and adding a pointer to object 506, adding an entry to a database table using a primary key of object 506, or writing another entry into a list, vector, queue, array, and/or the like.

Figure 5B:
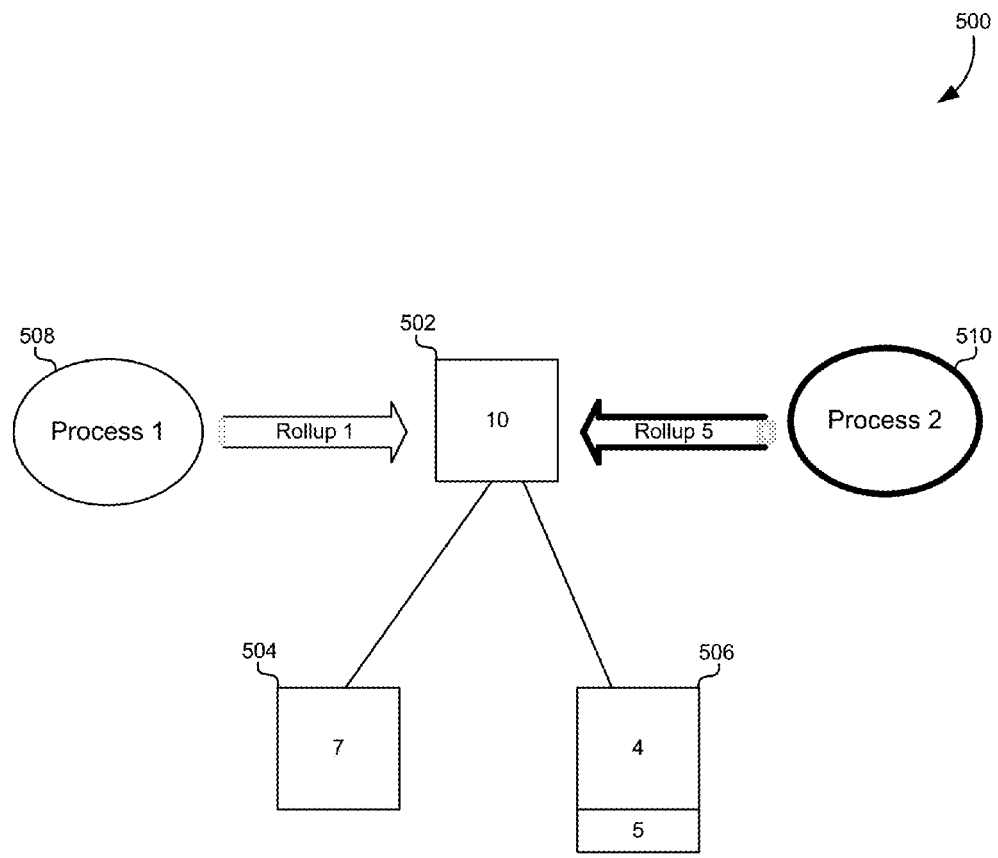

FIG. 5B illustrates the data structure 500 after process 508 releases the lock on object 506. The value stored in object 506 now includes the existing value ("3") combined with the new value ("1") added by process 508. It also shows that the value added by process 510 ("5") has been associated with object 506. In this embodiment, combining objects may include simply aggregating values together.

Because object 506 is part of the data hierarchy, the changed values must be rolled up the hierarchy. Therefore, process 508 and process 510 may again compete for a lock on object 502. In this case, process 510 may obtain the lock on object 502. Therefore process 510 may combine the value of "5" with the value of "10" already stored in object 502 (along with any other values associated with object 502). Also, process 508 may associate the value of "1" with object 502 as described above.

Figure 5C:
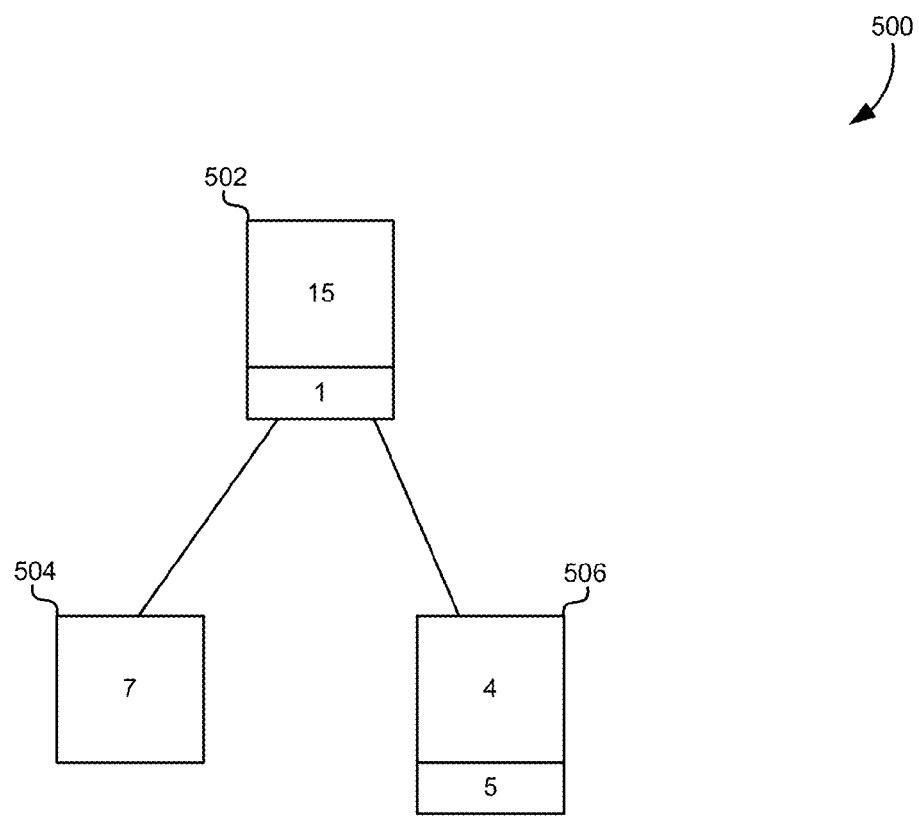

FIG. 5C illustrates the data structure 500 after process 510 releases the lock on object 502. Note that both object 502 and object 506 have a value stored therein, as well as values associated with the objects. Multiple values are allowed to persist until a process acquires a lock on object 502 and/or object 506, or until a process accesses, views, or queries object 502 and/or 506. In one embodiment, an automated process may be employed to periodically check objects within the data structure 500 in order to detect multiple values and combine these values into a single value for each object. This automated process may operate in a fashion similar to a garbage collector for a memory management system.

Figure 5D:
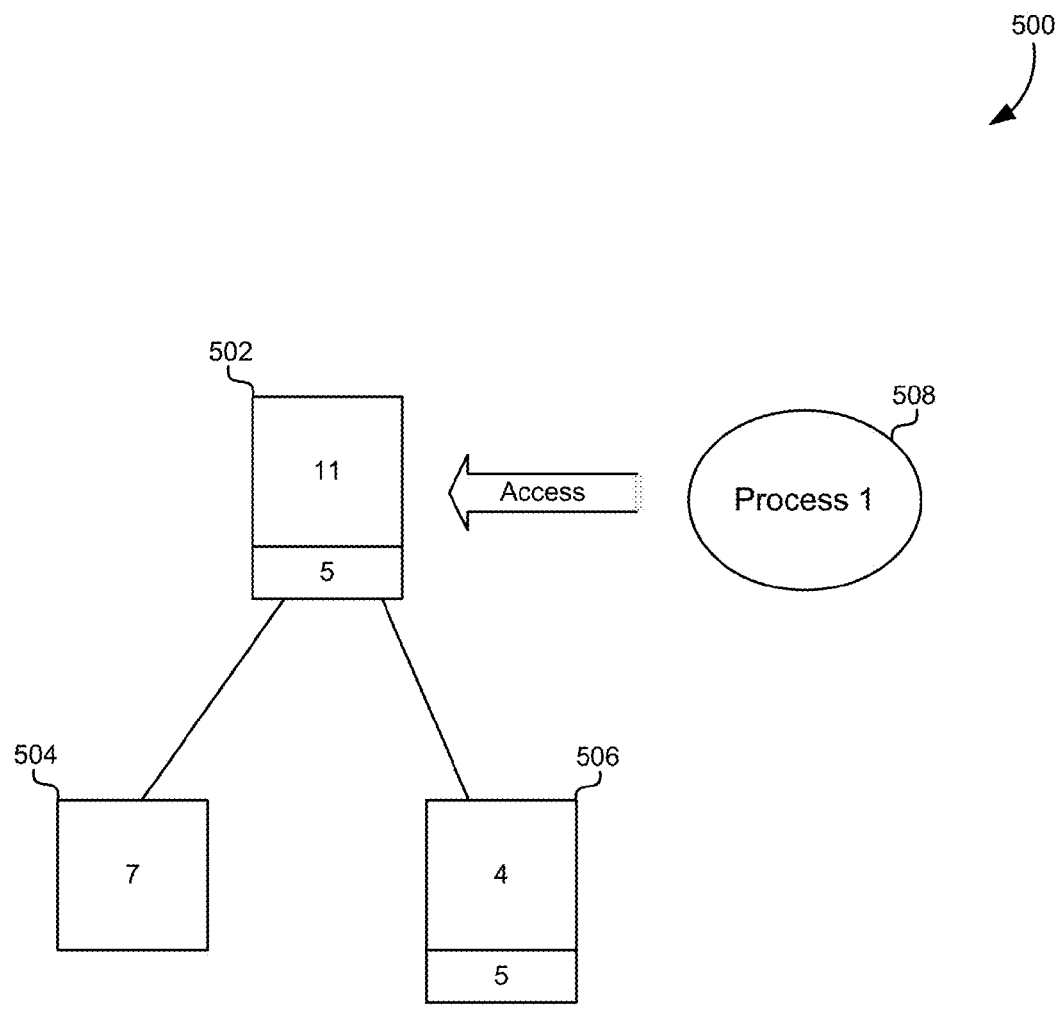

FIG. 5D illustrates the data structure 500 when a process, such as process 508 attempts to access an object with one or more values associated with the object. As part of the view/access/query, process 508 may initiate a series of steps similar to when a process obtains a lock on an object. For example, process 508 may retrieve a value stored in object 502, along with any values associated with object 502, and combine them. In this case, the values of "11" and "5" may be combined and stored in object 502 in response to the view/access/query of process 508.

In some implementations, the higher volume of UI queries may be deemed too excessive for each UI process to compete for locks, and forcing each UI to have the overhead of performing inserts/updates/deletes may be undesireable. In these implementations, the UIs may simply aggregate the data each and every time it accesses an object, relying on the guarantee that the number of rows they needs to aggregate has been kept low as was previously discussed. Allowing the UI to simply perform SQL queries to select/aggregate object values rather than attempting to obtain a lock may also eliminate the need for additional Java programming in the UI.

Figure 5E:
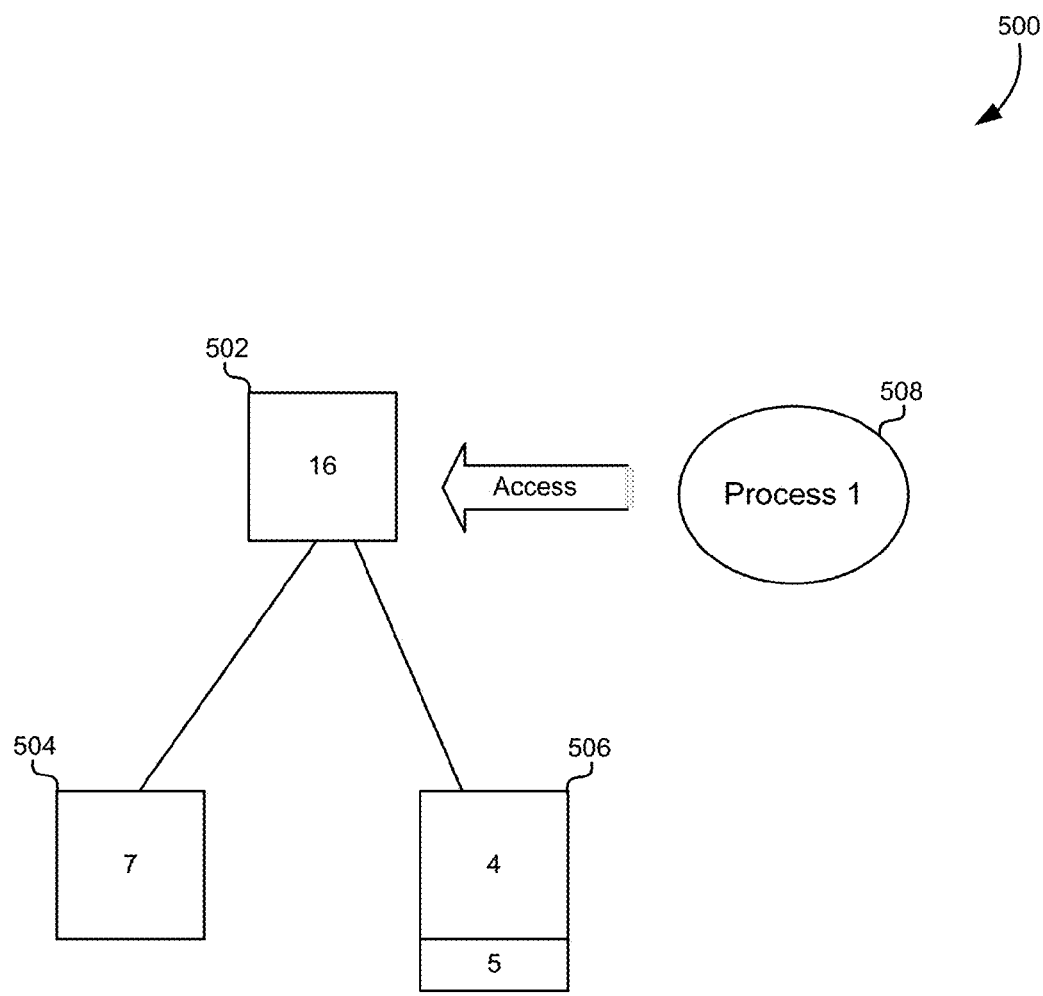

FIG. 5E illustrates the data structure 500 after process 508 accesses object 502. Note that the value stored in object 502 and the values associated with object 502 have been combined during the access process. (Again, the query or viewing process may simply aggregate the totals without acquiring a lock, deleting duplicates, and storing the new values.) The values for object 506 can remain separate until object 506 is accessed, until object 506 is written to, or until an automated process detects multiple values and combines them automatically. Combining values on demand may alleviate strain on system resources.

As described above, data structure 500 may be implemented using any hierarchical data structure. Merely by way of example, data structure 500 may be implemented using a relational database. In order to describe this example fully, a similar series of steps will now be using a relational database.

Figure 6A:
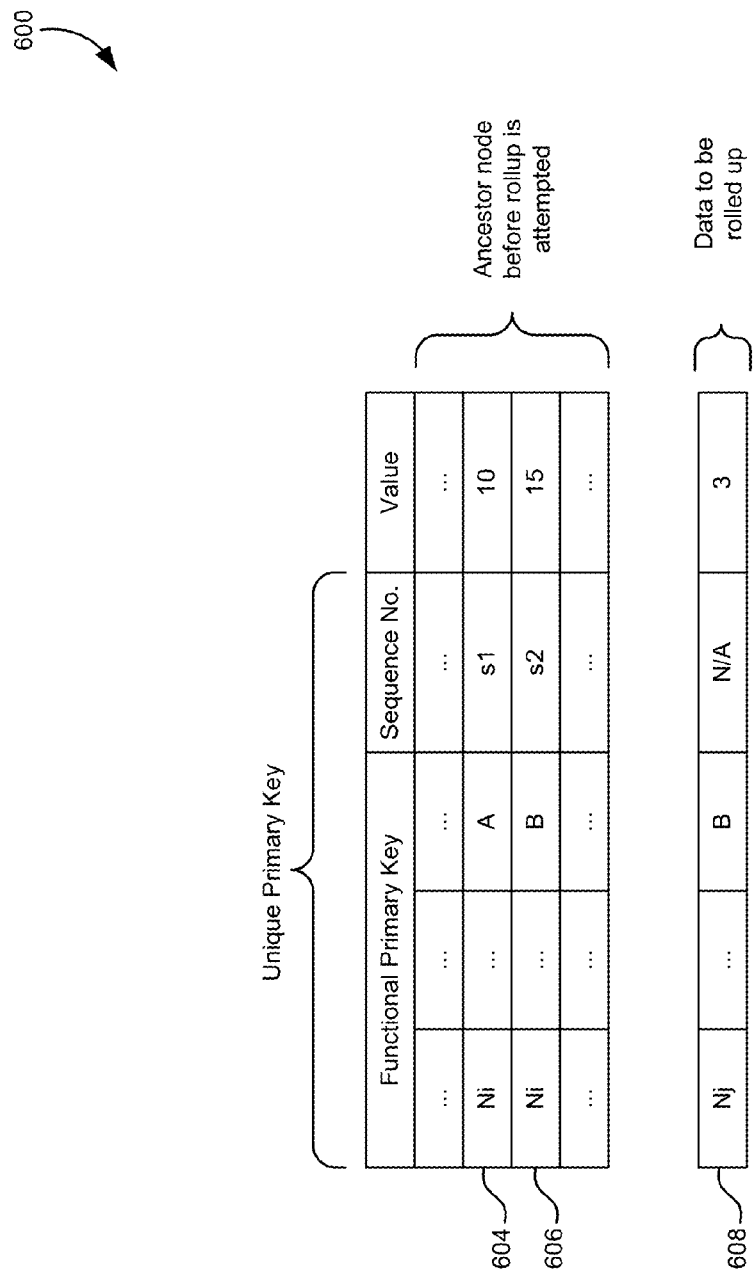

FIGS. 6A-6D illustrate a database implementation for concurrently accessing hierarchical data, according to one embodiment. FIG. 6A illustrates a database table 600 storing information for a particular object or set of objects. In most database implementations, a primary key is a unique key used to identify individual entries in a database table. A primary key must be unique, and this requirement is generally enforced by the database system. Because the methods and systems described herein allow for multiple entries with a same primary key, a new field may be added to each table entry. For example, a functional primary key may identify an object. To this, a sequence number may be added that is guaranteed to be unique for each entry for each object across all of the object's fields.

In this example, entry 604 and entry 606 may each be associated with a functional primary key identifying the same object. A sequence number may be added to each of entry 604 and entry 606 in order to distinguish them and the values associated with those entries. Note that additional entries may also be associated with object Ni represented by the ellipses above and below entry 604 and entry 606, respectively.

Entry 608 represents an additional value to be combined with the object. In some cases, this may come from a process attempting to write a new value to the object. In this example, entry 608 represents data to be rolled up from object Nj, which may be a child object of object Ni. In this particular case, entry 608 does not yet have a sequence number, but it may receive one once written to table 600.

For purposes of this example, it may be assumed that a second process already has a lock on object Ni. Therefore, entry 608 cannot be simply combined with an existing entry of table 600, but instead entry 608 may be associated with object Ni by writing the data to a new row in table 600. FIG. 6B illustrates table 600 after entry 608 is associated with object Ni and written to table 600. Entry 610 may represent entry 608 with a sequence number added to the entry. At this point, there are three values associated with object Ni.

Figure 6C:
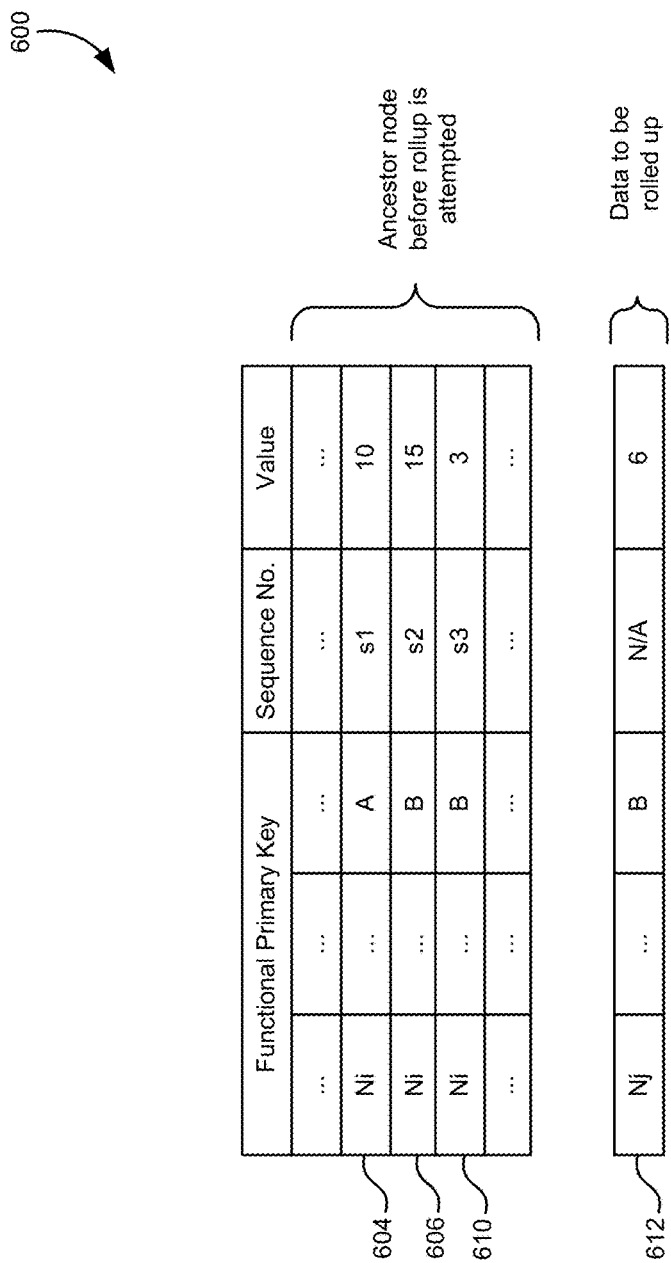

FIG. 6C illustrates table 600 when a new value is to be combined with object Ni. For purposes of this example, it may be assumed that the process adding entry 612 to object Ni is able to obtain a lock on object Ni. In the database implementation, this process may use a ROWID function to return the primary keys of entry 604, entry 606, and entry 610. The values for each of these entries may then be combined with the value of entry 612 in order to generate a single value for object Ni. It should be noted that while this process has a lock on object Ni, other processes may add new entries to table 600 that will not be aggregated by this process. These duplicate values may be allowed to persist until another modify/query/access operation takes place on object Ni.

In this particular embodiment, the functional primary key may have multiple columns associated with it. In this example, one column contains the values A and B. These values may correspond to different resources represented by the object, such as different users of a workstation, and/or the like. It may be possible for a process to query specific columns within the functional primary key of an object that aggregates/returns only those values associated with, for example, A or B. Other embodiments may use a single value for the functional primary key and may simply aggregate and return all values associated with the functional primary key.

FIG. 6D illustrates table 600 after an aggregation procedure has taken place for column B of the functional primary key. The accessing process may use the row IDs returned by the initial ROWID process to extract a value stored therein and combined them with the new value. Therefore, entry 606 and entry 610 may be deleted if the original ROWID command was specific to entries with the B value. A new entry 614 may contain the combined value (15+3+6=24). This step may also comprise committing the changes to the database to be reflected in its live data.

Figure 7:
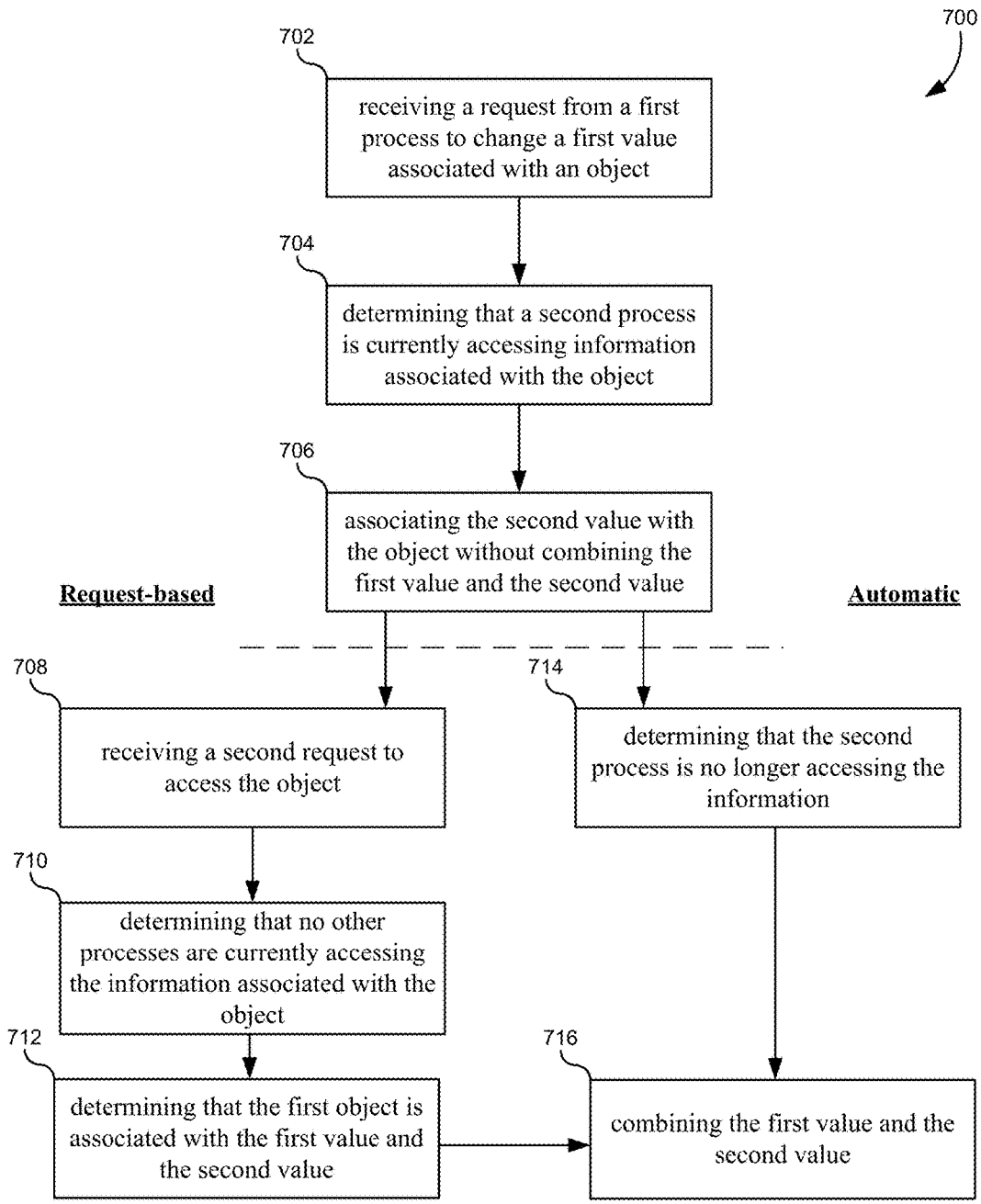
FIG. 7 illustrates a flowchart of a method for updating a hierarchy, according to one embodiment.

FIG. 7 illustrates a flowchart 700 of a method for updating a hierarchy, according to one embodiment. This method may be implemented using either a general purpose computer system, or a dedicated hardware system described in relation to FIG. 8 below. The method may include receiving a request from a first process to change a first value associated with an object (702). In one embodiment, the first process may be part of a database management system, and may originate from an internal or external system. In one embodiment, the second process may originate from a user workstation operating as part of an Enterprise Software System.

The method may also include determining that a second process is currently accessing information associated with the object (704). The information associated with the object may comprise a row in a database table, a database table itself, an entry in a data structure, a value associated with a pointer stored in a database structure, and/or the like. In one embodiment, the object may be part of a hierarchical data structure comprised of parent-child relationships. In one embodiment, the data structure may comprise a relational database. The object may be associated with one or more rows having the same functional primary key, or primary key. Each of these rows may have different sequence keys.

The method may additionally include associating the second value with the object without combining the first value and the second value (706). The second value may be associated with a child object of the object in the hierarchy. Associating the second value with the object may occur in response to a determination that the second process is currently accessing information associated with the object. In the case of a relational database, the object may comprise one or more rows in the database, and associating the second value with the object may comprise adding a row to the database that identifies the object and includes the second value. In one embodiment, this may include a database entry having a same functional primary key as the one or more rows associated with the object, and/or a different sequence key.

In some cases, operations may be performed to combine the first value and the second value. These operations may take place automatically in a garbage-collector-like process, or may take place based on a request to view/access/modify the object. In the case of an automatic process, the method may further include determining that the second process is no longer accessing the information associated with the object (714). This may include detecting that the second process has released a lock on the object. In response, or at a regular time interval, the method may also include combining the first and the second value (716).

In cases where the combination is request based, the method may include receiving a second request to access the object (708). The second request may be to access, to modify, to view, to query, and/or the like. The method may further include determining that no other processes are currently accessing information associated with the object (710). This may comprise successfully obtaining a lock on the object, or determining that no other processes have a lock on the object.

The method may additionally include determining that the first object is associated with the first value and the second value (712). In one embodiment, this may include retrieving a set of rows in a relational database that include the object's functional primary key. In another embodiment, this may include following one or more pointers that are associated with the object to an additional memory location storing the second value.

The method may again include combining the first value in the second value (716). In one embodiment, a third value may also be combined that is part of the second request to access the object. Combining may include adding, subtracting, multiplying, dividing, and/or any other mathematical or logical combination technique known in the art. Combining the first value and the second value may also include deleting or freeing memory locations that were associated with the second value and/or the first value. It may also include committing the new combined value to the data structure to overwrite or replace the first value stored with the object.

It should be appreciated that the specific steps illustrated in FIGS. 4 and 7 provide particular methods of providing for concurrent access of a data hierarchy according to various embodiments of the present invention. Other sequences of steps may also be performed according to alternative embodiments. For example, alternative embodiments of the present invention may perform the steps outlined above in a different order, or may perform one step iteratively for all data objects while performing another step in parallel using sub-processes or for all the data objects at once using SQL operations. Moreover, the individual steps illustrated in FIGS. 4 and 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
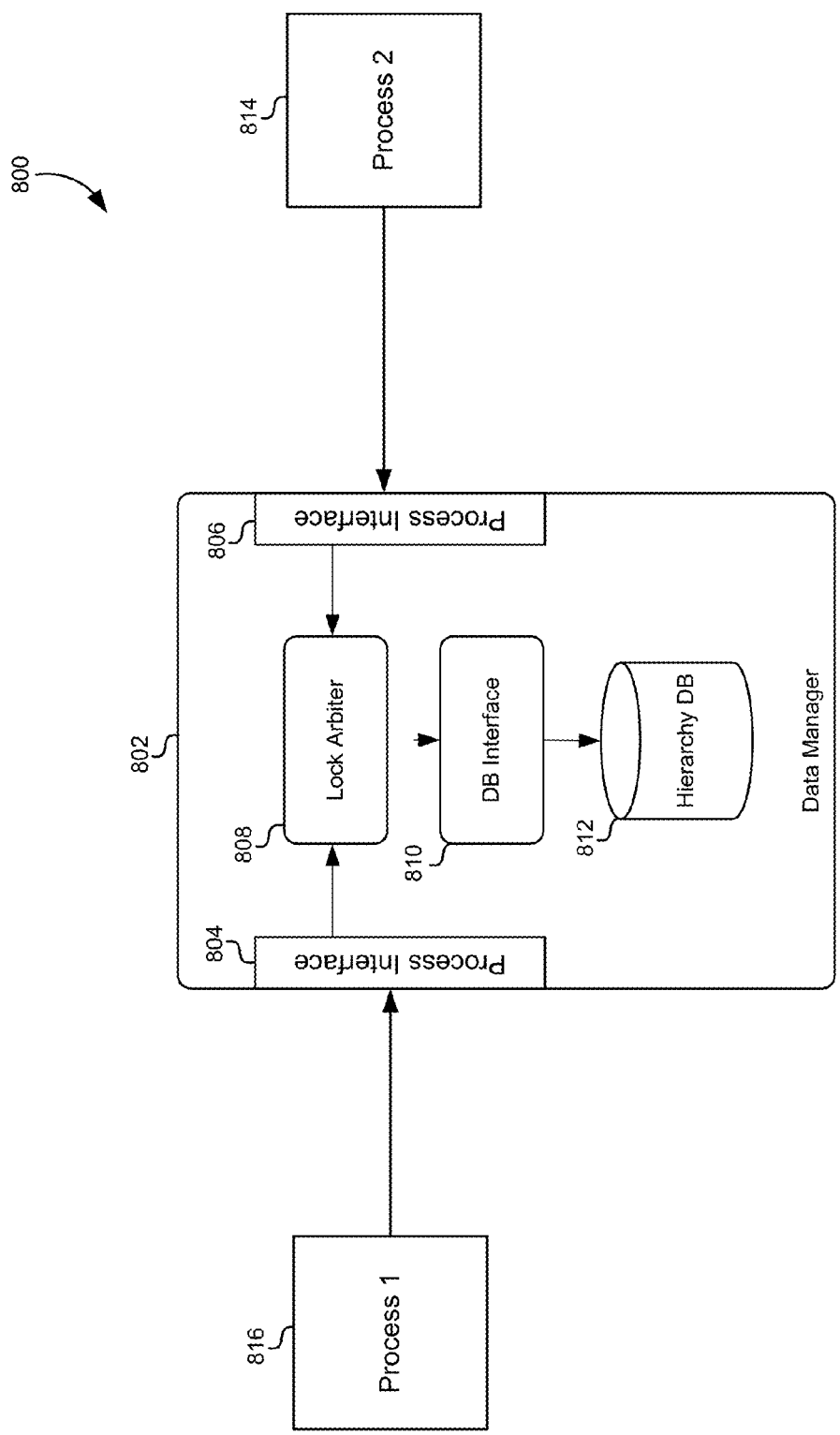
FIG. 8 illustrates a block diagram of a data management system, according to one embodiment.

FIG. 8 illustrates a block diagram 800 of a data management system 802, according to one embodiment. The data management system 802 may be constructed using dedicated hardware, such as transistors, resistors, diodes, integrated circuits, etc., as well as other components that are well known in the art. In other words, the data management system 800 need not be implemented in software on a general purpose computer, but rather may be implemented using a special-purpose computer specifically designed to carry out the methods described above.

The data management system 802 may include process interfaces 804, 806, along with additional process interfaces that are not shown for brevity, that are configured to receive requests from various processes 814, 816 that are communicatively coupled to the data management system 802. These requests may comprise data to be added to a data structure. The data management system 802 may include a lock arbiter 808 configured to determine and govern which of the processes 814, 816 may have exclusive access to one or more objects stored in the data management system 802. The lock arbiter 808 may allow exclusive access to process 816, while allowing process 814 to associate a value with a locked object.

The data management system 802 may also include a database interface 810 configured to manage access and operations to one or more databases. The one or more databases may include a hierarchy database 812 that stores hierarchical data. The hierarchical data may include either single-parent or multi-parent arrangements. The lock arbiter 808 may access the hierarchy database 812 through the database interface 810 and write, retrieve, and/or associate data with various object representations stored in the hierarchy database 812.

In one embodiment, the various modules and systems in FIG. 8 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory, computer-readable storage medium comprising instructions that, when executed by one or more processors, cause the one or more processors to perform operations comprising:
receiving a first value associated with an object, wherein the object comprises a node in a hierarchy, and the first value is directly associated with the node in the hierarchy;
storing the first value and a primary key in a first row of a database;
receiving a second value associated with the object, wherein the second value is associated indirectly with the node in the hierarchy, but associated directly with a child node of the node in the hierarchy;
storing the second value and the primary key in a second row of the database;
determining that the first row and the second row both include the primary key; and
in response to determining that the first row and the second row both include the primary key, aggregating the first value and the second value into a single row in the database.

2. The non-transitory, computer-readable storage medium of claim 1, wherein the first value associated with the object is received from a first process.

3. The non-transitory, computer-readable storage medium of claim 2, wherein the second value associated with the object is received from a second process that is different from the first process.

4. The non-transitory, computer-readable storage medium of claim 3, wherein the request from the second process is received while the first process has acquired a lock on values associated with the object.

5. The non-transitory, computer-readable storage medium of claim 4, wherein storing the second value and the primary key in a second row of the database is performed while the first process has acquired the lock on values associated with the object.

6. The non-transitory, computer-readable storage medium of claim 1, wherein a total number of rows in the database that include the primary key is bounded in size by a number of processes attempting to concurrently acquire a lock on values associated with the object.

7. The non-transitory, computer-readable storage medium of claim 1, wherein determining that the first row and the second row both include the primary key is performed as part of a garbage-collection routine.

8. The non-transitory, computer-readable storage medium of claim 1, wherein determining that the first row and the second row both include the primary key is performed at a time when no processes have acquired a lock on values associated with the object.

9. The non-transitory, computer-readable storage medium of claim 1, wherein determining that the first row and the second row both include the primary key is performed in response to receiving a third value associated with the object.

10. The non-transitory, computer-readable storage medium of claim 1, further comprising additional instructions that, when executed by the one or more processors, cause the one or more processors to perform additional operations comprising:
receiving a third value associated with the object;
storing the third value and the primary key in a third row of the database;
determining that the first row, the second row, and the third row include the primary key; and
in response to determining that the first row, the second row, and the third row include the primary key, aggregating the first value, the second value, and the third value into a single row in the database.

11. The non-transitory, computer-readable storage medium of claim 1, further comprising additional instructions that, when executed by the one or more processors, cause the one or more processors to perform additional operations comprising:
storing a first sequence key in the first row of the database.

12. The non-transitory, computer-readable storage medium of claim 11, further comprising additional instructions that, when executed by the one or more processors, cause the one or more processors to perform additional operations comprising:
storing a second sequence key in the second row of the database, wherein the first sequence key is different from the second sequence key.

13. The non-transitory, computer-readable storage medium of claim 12, wherein rows in the database with a same primary key and different sequence keys indicate multiple values associated with objects to be aggregated into single rows in the database.

14. The non-transitory, computer-readable storage medium of claim 1, wherein receiving the second value associated with the object is part of a data-rollup operation where values associated directly with child nodes are aggregated into values associated directly with parent nodes.

15. The non-transitory, computer-readable storage medium of claim 1, wherein the hierarchy comprises a multi-parent hierarchy.

16. A method of aggregating multiple values associated with an object, the method comprising:
receiving, by a computer system, a first value associated with the object, wherein the object comprises a node in a hierarchy, and the first value is directly associated with the node in the hierarchy;
storing, by the computer system, the first value and a primary key in a first row of a database;
receiving, by the computer system, a second value associated with the object, wherein the second value is associated indirectly with the node in the hierarchy, but associated directly with a child node of the node in the hierarchy;
storing, by the computer system, the second value and the primary key in a second row of the database;
determining, by the computer system, that the first row and the second row both include the primary key; and
in response to determining that the first row and the second row both include the primary key, aggregating, by the computer system, the first value and the second value into a single row in the database.

17. A system comprising:
one or more processors; and
one or more memory devices comprising instructions that, when executed by the one or more processors, cause the one or more processors to perform operations comprising:
receiving a first value associated with an object, wherein the object comprises a node in a hierarchy, and the first value is directly associated with the node in the hierarchy;
storing the first value and a primary key in a first row of a database;

receiving a second value associated with the object, wherein the second value is associated indirectly with the node in the hierarchy, but associated directly with a child node of the node in the hierarchy;

storing the second value and the primary key in a second row of the database;

determining that the first row and the second row both include the primary key; and in response to determining that the first row and the second row both include the primary key, aggregating the first value and the second value into a single row in the database.

\* \* \* \* \*